United States Patent
Rai et al.

(10) Patent No.: US 9,332,459 B1
(45) Date of Patent: May 3, 2016

(54) METHOD AND SYSTEM FOR SETTING A HOLD-TIMER DURATION

(71) Applicant: Sprint Spectrum L.P., Overland Park, KS (US)

(72) Inventors: Deveshkumar N. Rai, Overland Park, KS (US); Saravana Velusamy, Olathe, KS (US); Kristin A. Hayne, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 142 days.

(21) Appl. No.: 13/970,973

(22) Filed: Aug. 20, 2013

(51) Int. Cl.
*H04W 36/00* (2009.01)

(52) U.S. Cl.
CPC .................................. *H04W 36/0011* (2013.01)

(58) Field of Classification Search
None
See application file for complete search history.

(56) References Cited

U.S. PATENT DOCUMENTS

| | | | |
|---|---|---|---|
| 2010/0144363 A1* | 6/2010 | De Rosa et al. | 455/452.1 |
| 2013/0344873 A1* | 12/2013 | Sane et al. | 455/437 |
| 2015/0023184 A1* | 1/2015 | Cili et al. | 370/252 |
| 2015/0056993 A1* | 2/2015 | Zhu et al. | 455/435.1 |

* cited by examiner

*Primary Examiner* — Huy D Vu
*Assistant Examiner* — Hong Shao

(57) ABSTRACT

A method and system for setting a hold-timer duration is disclosed. The method involves a first network initially serving a user equipment device (UE), wherein serving the UE comprises allocating at least one resource to the UE and using the at least one resource to serve the UE. The method also involves detecting transition of the UE from being served by the first network to being served by a second network. The method further involves, after the UE transitions to the second network, applying a hold-timer having a hold-timer duration for release of the at least one resource. Further, the method involves, before setting the hold-timer duration, the first network receiving from the UE a report including an indication of radio frequency (RF) quality of the second network. The method also involves using the reported indication of RF quality as a basis to set the hold-timer duration.

20 Claims, 5 Drawing Sheets

METHOD AND SYSTEM FOR SETTING A HOLD-TIMER DURATION

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of WCDs, initiation of communications, handoff between coverage areas, and functions related to air interface communication.

In accordance with the air interface protocol, each coverage area may operate on one or more carrier frequencies or "carriers." More particularly, the base station that radiates to define a given coverage area may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service on one or more carrier frequencies with each supported band. In a frequency division duplex (FDD) arrangement, different carrier frequencies are used for the downlink than the uplink. Whereas, in a time division duplex (TDD) arrangement, the same carrier frequency is used for the downlink and uplink and is allocated over time among downlink and uplink communications.

On each carrier frequency in a coverage area, the coverage area may also define a number of air interface channels for carrying information between the base station and the WCDs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that WCDs may detect as an indication of coverage and may measure to evaluate coverage strength. As another example, each coverage area may define an uplink control channel or other resource on which WCDs may transmit control messages such as registration requests and access requests to the base station. And each coverage area may define a downlink control channel or other resource on which the base station may transmit control messages such as system information messages and page messages to WCDs. Each coverage area may then define one or more traffic channels or other resources for carrying communication traffic such as voice data and other data between the base station and WCDs.

When a WCD first powers on or enters into coverage of the network, the WCD may scan for and identify a strongest pilot or reference signal and may register with the network by transmitting a registration request or attach request to a base station providing that signal. This registration process may serve to notify the network of the WCD's presence in a particular coverage area and to facilitate network authentication of the WCD. Once registered, the WCD may then operate in an idle mode in which the WCD monitors a downlink control channel to receive overhead information and to check for any page messages. In the idle mode, the WCD may have no assigned traffic channel resources on which to engage in bearer communication.

When the network has a communication (such as a voice call or other traffic) to provide to a WCD that is registered with the network but is operating in the idle mode, the network may page the WCD in an effort to then facilitate assigning traffic channel resources to the WCD. In particular, the network may transmit on the downlink a page message addressed to the WCD. Assuming the WCD receives this page message, the WCD may then transmit to the network a page response message on the uplink. And upon receipt of the page response message, the network may then assign traffic channel resources to the WCD, for use to carry the communication, thus transitioning the WCD to a connected or active mode in which the WCD can engage in the communication.

Likewise, when an idle WCD seeks to initiate a communication (such as to place a voice call or engage in other bearer communication), the WCD may transmit on the uplink to the base station an origination or connection request, and the network may then assign traffic channel resources to the WCD for use to carry the communication, similarly transitioning the WCD to a connected or active mode in which the WCD can engage in the communication.

OVERVIEW

A method and system for setting a hold-timer duration is disclosed. An example method is operable in a communication system comprising a first network configured to serve user equipment devices (UEs) according to a first air interface protocol and a second network configured to serve UEs according to a second air interface protocol. The method involves the first network initially serving a UE, wherein the first network serving the UE comprises the first network allocating at least one resource to the UE and using the at least one resource to serve the UE. The method also involves the first network detecting transition of the UE from being served by the first network to being served by the second network. Further, the method involves, after the UE transitions from being served by the first network to being served by the second network, the first network applying a hold-timer having a hold-timer duration for release of the at least one resource that the first network allocated to the UE. Still further, the method involves, before setting the hold-timer duration for the hold-timer, the first network receiving from the UE a report including an indication of radio frequency (RF) quality of the second network. Yet still further, the method involves the first network using the reported indication of RF quality as a basis to set the hold-timer duration.

In another example, the method involves the first network initially serving a UE, wherein the first network serving the UE comprises the first network allocating at least one resource to the UE and using the at least one resource to serve the UE. The method also involves the first network detecting transition of the UE from being served by the first network to being served by the second network. Further, the method involves, before the UE transitions from being served by the first network to being served by the second network, the first network setting a hold-timer duration for a hold-timer for release of the at least one resource that the first network allocated to the UE, wherein setting the hold-timer duration comprises (i) the first network receiving from the UE a report including an indication of RF quality of the second network and (ii) the first network using the reported indication of RF quality as a basis to set the hold-timer duration. Still further, the method involves, after the UE transitions from being served by the first network to being served by the second network, the first network applying the hold-timer having the hold-timer duration.

In an example embodiment, the system may be a wireless network that includes an antenna, a memory, and a processor. The antenna may radiate to define a coverage area. The memory may be configured to store program instructions. Further, the processor may be capable of executing the program instructions to: (i) allocate at least one resource to the UE; (ii) use the at least one resource to serve the UE; (iii) detect transition of the UE from being served by the wireless network to being served by a second wireless network; (iv) after the UE transitions from being served by the wireless network to being served by the second wireless network, apply a hold-timer having a hold-timer duration for release of the at least one resource that the wireless network allocated to the UE; (v) before setting the hold-timer duration for the hold-timer, receive from the UE a report including an indication of RF quality of the second wireless network; and (vi) use the reported indication of RF quality as a basis to set the hold-timer duration.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
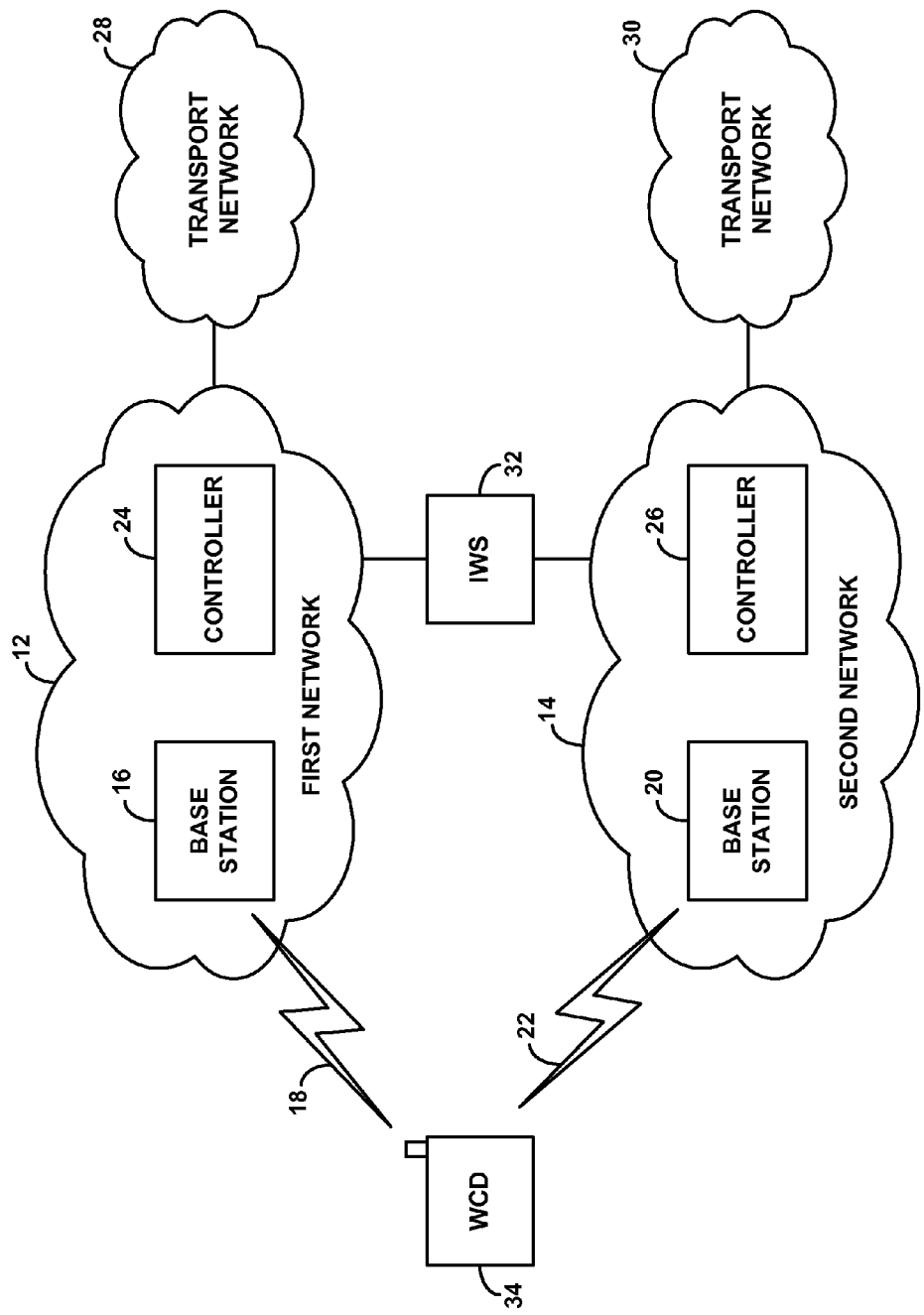
FIG. 1 is a simplified block diagram of a network arrangement in which an exemplary embodiment of the present method and apparatus can be implemented.

1. Overview of an Example Method and System

In systems that provide service under more than one air interface protocol, service providers may implement functionality that allows WCDs to operate by default on one air interface protocol and to dynamically switch over to operate on another air interface protocol when necessary to engage in certain communications. By way of example, in a system that supports both LTE service for mobile broadband and an older protocol such as CDMA or GSM for traditional voice calls, service providers may implement "circuit switched fallback" (CSFB) functionality, which allows WCDs to operate by default on LTE and to switch over to operate on CDMA or GSM to engage in voice calls. This CSFB functionality may, for example, include standard CSFB functionality and/or enhanced circuit switched fallback (eCSFB) functionality.

When CSFB functionality is implemented, for instance, a hybrid CDMA/LTE WCD may be arranged by default to scan for and register with an LTE network and to operate with its CDMA functionality off, but to then engage in control signaling with the CDMA network via the LTE network, i.e., over the LTE air interface. To facilitate this, when the WCD registers with the LTE network, LTE network infrastructure such as a mobility management entity (MME) may signal through an interworking server (IWS) with the CDMA network to register the WCD with the CDMA network as well. In an example, the hybrid CDMA/LTE WCD may be configured such that the LTE functions and CDMA functions are carried out by the same hardware platform.

In turn, when the CDMA network has a voice call to connect to the WCD, the CDMA network may signal through the IWS to the LTE network to cause the LTE network to transmit a CSFB page message to the WCD over the LTE air interface. After further CSFB signaling through the LTE network, the WCD may then use its CDMA functionality and tune to the CDMA network to engage in the call over the CDMA air interface.

In one implementation of this process, for instance, once the WCD receives the CSFB page message for the incoming CSFB call, the WCD may transmit a CSFB extended service request message to its serving LTE base station as a request to set up the incoming CSFB call. In turn, the LTE base station may then send to the WCD a list of CDMA carriers on which the local CDMA network provides service. And the WCD may use its CDMA radio to scan for coverage on each of the listed CDMA carriers and transmit to the LTE base station a report of the strongest CDMA pilot signals and corresponding signal strengths that the WCD detected. The LTE network may then pass those pilot signal measurements via the IWS to the CDMA network, and the CDMA network may use those measurements as a basis to determine a CDMA coverage area and traffic channel to assign to the WCD. The CDMA network may then transmit a handover direction message via the IWS to the LTE network, which the LTE network may transmit to the WCD, directing the WCD to transition to CDMA to communicate in the assigned CDMA coverage area and traffic channel. The WCD may then use its CDMA radio to tune to the assigned channel and to engage in the call via CDMA.

Likewise, when the WCD is served by the LTE network and has a voice call to place, the WCD may transmit over the LTE air interface to its serving LTE base station a CSFB extended service request message to request setup of an outgoing CSFB call, and the LTE base station may similarly send to the WCD a list of CDMA carriers on which the local CDMA network provides service. The WCD may then similarly tune to CDMA and scan for coverage on each of the listed CDMA carriers, and report the strongest detected CDMA pilots to the LTE base station. And the CDMA network may similarly determine a CDMA coverage area and traffic channel to assign to the WCD and transmit a handover direction message via the IWS to the LTE network for transmission to the WCD. The WCD may then similarly use its CDMA radio to tune to the assigned channel and to engage in the call via CDMA. This CSFB call setup process allows the WCD to engage in CDMA voice call setup through its existing LTE connection, without the need for the WCD to be idling in CDMA coverage in the first place.

Under LTE, when the LTE network is serving a WCD (i.e., a UE), the LTE network may allocate at least one resource to the UE and may use that at least one resource to serve the UE. For example, the LTE network may allocate a bearer to the UE and may use that bearer to serve the UE. The LTE network may also store (e.g., at the MME) a context record for the UE. However, when a UE transfers to the CDMA network in a CSFB scenario, the LTE network may then release the at least one resource allocated to the UE, so as to avoid wastage of the at least one resource. The at least one resource may then, for example, be utilized by other UEs being served by the LTE network. In another example, use of the at least one resource may be suspended until the UE returns to the LTE network (e.g., after completion of the CSFB call).

Releasing the at least one resource may involve various degrees of releasing the at least one resource. For example, releasing the at least one resource may involve a full release of the at least one resource. For instance, the LTE network may release the allocated bearer and may delete the stored context record. In such a case, the LTE network may then make the at least one resource available to one or more other UEs being served by the LTE network. As another example, releasing the at least one resource may involve a partial release of the at least one resource. For instance, the LTE network may release the allocated bearer but may maintain the stored context record. In such a case, by releasing the bearer, the LTE network will suspend use of the bearer. However, if the UE returns to the LTE network (e.g., after completing the CSFB call), the LTE network may refer to the maintained context record to facilitate serving the UE. This maintained context record may include information about the released (i.e., suspended) bearer. The LTE network may then resume the suspended bearer to serve the UE once again.

The LTE network may release the at least one resource allocated to the UE at various times. In a common example, the LTE network releases the at least one resource allocated to the UE in response to the UE transferring from the LTE network to the CDMA network to be served by the CDMA network. In another example, the LTE network may wait a set time period before releasing the at least one resource allocated to the UE by the LTE network. For instance, the LTE network may be configured to release the at least one resource a certain amount of time (e.g., 10 seconds, 15 seconds, 20 seconds, etc.) after the UE transitions from the LTE network to the CDMA network to be served by the CDMA network. Typically the value of the hold-timer duration is a static value, and the LTE network applies that static value for the hold-timer duration. The LTE network may typically apply the same value for all CSFB calls or for all CSFB calls of a given type.

A problem with using a static value for the hold-timer duration, however, is that some CSFB calls are more likely to complete call setup that other CSFB calls, and it may be more useful to maintain the at least one allocated resource for a UE when call setup fails (rather than when call-setup is successful). For instance, in the event of call-setup success failure, the UE may transition back to the LTE network before setup of the CSFB call is complete. Therefore, in such a case, it would be beneficial to have maintained the at least one resource allocated to the UE, so that the LTE network could once again serve the UE using the reserved at least one resource. Reserving the at least one resource in this case may allow the UE to reconnect to the LTE network in a more efficient fashion than the UE would be able to if the at least one resource has already been released.

On the other hand, a problem with process of releasing the at least one resource at a set time after the transition is that, in the event of call-setup success, the at least one resource may be reserved by the LTE network for the UE longer than necessary. For example, should the UE complete the call setup and engage in the CSFB call, the at least one resource may still be reserved for the UE by the LTE network even while the UE is engaged in the CSFB call on the CDMA network. This may result in wastage of resources. For example, in such a case, the LTE network may assume that the UE is still active on the LTE network and thus may continue with paging and traffic flows, which eventually may result in wastage of resources because of delivery failure. As another example, the at least one resource still reserved for the UE by the LTE network could instead be used for other UEs. Thus, the LTE network waiting a set time period before releasing the at least one resource may be an unproductive and inefficient use of resources. In such a case, it would have been beneficial to have quickly released the at least one resource allocated to the UE, so that the LTE network could avoid wastage of the at least one resource.

The disclosed method and system offers an improved way to set the hold-timer duration for releasing the at least one resource allocated to the UE in a first network in a fallback communication situation. In particular, the disclosed method and system may take into account the likelihood of CSFB call-setup success. As a result, the disclosed method and system balances between (i) the desire to not hold bearer and/or context resources too long when a UE moves away from LTE and (ii) the desire to hold bearer and/or context resources long enough to be able to still use them in case CSFB call setup fails.

Accordingly, in one example aspect, disclosed is a method that may be implemented in a communication system that includes a first network configured to serve UEs according to a first air interface protocol and a second network configured to serve UEs according to a second air interface protocol. The method involves the first network initially serving a UE, wherein the first network serving the UE comprises the first network allocating at least one resource to the UE and using the at least one resource to serve the UE. The method also involves the first network detecting transition of the UE from being served by the first network to being served by the second network. Further, the method involves, after the UE transitions from being served by the first network to being served by the second network, the first network applying a hold-timer having a hold-timer duration for release of the at least one resource that the first network allocated to the UE. Still further, the method involves, before setting the hold-timer duration for the hold-timer, the first network receiving from the UE a report including an indication of radio frequency (RF) quality of the second network. Yet still further, the method involves the first network using the reported indication of RF quality as a basis to set the hold-timer duration.

2. Example Communication System Architecture

As noted above, FIG. 1 is a simplified block diagram of a network arrangement in which an exemplary embodiment of the present method and system can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

The arrangement of FIG. 1 includes by way of example two representative access networks 12, 14, each of which may function to provide WCDs with air interface coverage and connectivity with one or more transport networks such as the PSTN and the Internet. As such, each of these networks may include multiple base stations that radiate to provide one or more respective coverage areas defining an air interface in which to exchange control and bearer data with WCDs. For simplicity in the arrangement shown, for instance, network 12 includes a representative base station 16 that radiates to provide a coverage area 18, and network 14 includes a representative base station 20 that radiates to provide a coverage area 22. As discussed above, each such coverage area may operate on one or more carriers.

Each network may then further include various network infrastructure to support setup of connections and communications and/or to provide connectivity with transport networks. This network infrastructure may take various forms and include any of a variety of network elements, including for instance a controller of one form or another. For instance, in the arrangement shown, network 12 includes a respective controller 24, and network 14 includes a respective controller 26. Network 12 is then shown providing connectivity with a representative transport network 28, and network 14 is shown providing connectivity with a representative transport network 30. In an example implementation, transport network 28 might be the Internet, and transport network 30 might be the PSTN.

As further shown in the figure, an IWS 32 is provided for passing signaling between the first network and the second network. In practice, the IWS may be provided as a function or element of one of the networks in particular. For instance, the IWS may be provided as a function of controller 26 in network 14. IWS may operate to pass signaling between the controllers 24, 26 and/or other elements of the networks. For instance, in the context of the present disclosure, the IWS may function to pass CSFB call setup messages or similar setup messages between the networks.

Network 12 and network 14, and IWS 32 may be owned and operated by a common wireless service provider, and the service provider may configure the networks to interwork with each other (or may arrange for the IWS to associate the networks with each other) so as to facilitate CSFB for instance. Alternatively, the networks may be owned and/or operated by separate wireless service providers, and those service providers may have an agreement with each other to allow for interworking between the networks, again to facilitate CSFB or the like.

With the arrangement shown in FIG. 1, a WCD 34 is shown positioned in coverage of both network 12 and network 14. When such a WCD first powers on or arrives in coverage of network 12, the WCD may scan for and detect coverage provided by network 12 and may responsively register with network 12 by transmitting in coverage area 18 to base station 16 a registration request. In response, network 12 (e.g., controller 24) may then record the fact that WCD 34 is present within coverage area 18 served by base station 16, so as to facilitate paging WCD 34 for calls or other incoming communications. Further, given the association between network 12 and network 14, network 12 may also responsively signal to IWS 32 to trigger registration of WCD 34 with network 14. WCD 34 may then idle in coverage area 18 of network 12.

When network 14 has a call or other communication to connect or otherwise provide to WCD 34, network 14 may then send a page message (or page message trigger) to IWS 32, which IWS 32 may pass along to network 12 to trigger paging of the WCD via network 12. Network 12 may then responsively page the WCD by having base station 16 transmit a CSFB page message to the WCD in coverage area 18. In line with the example CSFB procedures described above, once the WCD responds to this CSFB page, the WCD may then send a CSFB extended service request message to base station 16 to request setup of the CSFB communication. And likewise, when the WCD seeks to place a CSFB call, the WCD may establish connectivity with base station 16 and may send a CSFB extended service request message to base station 16 to request setup of that CSFB communication.

In either case, base station 16 may then transmit to the WCD a list of carriers of the second network 14 for the WCD to scan in search of coverage in which to engage in the communication. In practice, for instance, given the example association between these networks, base station 16 may be provisioned to provide as the list of carriers those on which base stations of network 14 operate. The WCD may then scan those carriers of network 14 in search of coverage and may report one or more strongest detected pilots in a measurement report to base station 16 of network 12. Network 12 may use this report as a basis to select a hold-timer duration for the hold timer.

Network 12 may then forward to the IWS 32 a representation of the WCD's measurement report, which IWS 32 may in turn provide to an element of network 14, such as controller 26. With that information, network 14 may then select an appropriate coverage area and traffic channel on which to have the WCD engage in the communication. And the network 14 may return to IWS 32 a handover direction message directing the WCD take transition to that coverage area and channel to engage in the communication. IWS 32 may then pass that handover direction message to network 12, and base station 16 may transmit the message in coverage area 18 to the WCD. The WCD may then transition to be served by the indicated coverage area and channel of network 14. After the WCD transitions to the network 14, network 12 may apply the hold timer for the set hold-timer duration.

Figure 2:
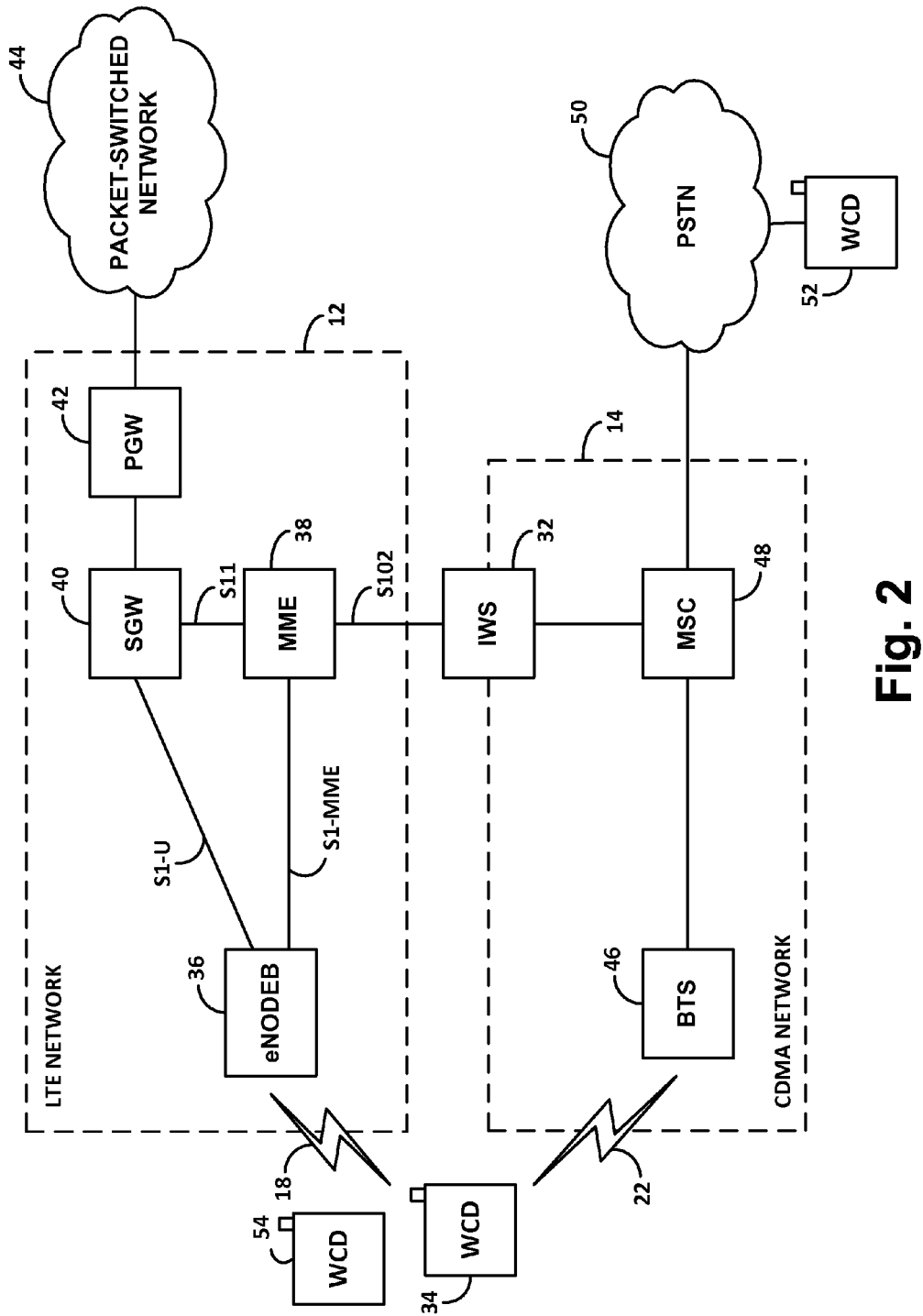
FIG. 2 is a simplified block diagram of a more specific network arrangement in which the exemplary embodiment can be implemented.

FIG. 2 is next a more specific block diagram depicting an example implementation of the network arrangement shown in FIG. 1. In the arrangement of FIG. 2, network 12 is an LTE network that primarily serves WCDs with wireless packet data communication service (including perhaps voice-over-packet and other packet-based real-time media service), and network 14 is a CDMA network that primarily serves WCDs with circuit-switched voice call service (but may also provide packet-data communication service and other types of service). These networks could take other forms as well, using other protocols such as WiMAX, GSM, or others now known or later developed.

The LTE network 12 in this arrangement is shown including a representative LTE base station 36 known as an eNodeB, which includes an antenna structure and associated equipment for engaging in LTE communication over the air interface of coverage area 18 with WCDs. The eNodeB 36 is then shown coupled with an MME 38 that serves as controller 24 and particularly as a signaling controller for the LTE network. Further, the eNodeB 36 is also shown coupled with a serving gateway (SGW) 40, which may then be coupled with a packet-gateway (PGW) 42 that connects with a packet-switched network 44. And the MME 38 is shown coupled with the SGW 40. Although the elements of the LTE network 12 are shown with direct connections between them, in a likely arrangement, the elements may sit as nodes on a core packet network, and thus the illustrated connections may be logical interfaces between the elements over that network.

The CDMA network 14, on the other hand, is shown including a representative CDMA base station 46 known as a base transceiver station (BTS), which includes an antenna structure and associated equipment for engaging in CDMA communication over the air interface of coverage area 22 with WCDs. The BTS 46 is then shown in communication (possibly through a base station controller (BSC) or radio network controller (RNC) (not shown)) with a mobile switching center (MSC) 48 that serves as controller 26 to manage paging over the CDMA air interface and that provides connectivity with the PSTN 50.

Further shown in FIG. 2 is then the IWS 32, which functions to facilitate interworking between the LTE network 12 and the CDMA network 14 as discussed above, so as to facilitate CSFB functionality for instance and to facilitate various specific features of the present disclosure.

In practice with this LTE/CDMA arrangement, the LTE eNodeB 36 may broadcast an overhead signal such as a System Information Block that includes data that a recipient WCD may programmatically interpret to mean that the LTE coverage area in which the overhead signal is broadcast is one that supports CSFB functionality. The WCD may then detect this broadcast signal and responsively register in coverage area 18 with the LTE network. Under LTE principles, the WCD may do so by transmitting an attach request to the eNodeB 36, including in the attach request data that indicates capabilities of the WCD and particularly an indication that the WCD supports CSFB functionality.

Upon receipt of this attach request, the LTE network may register presence of the WCD in coverage area 18 of eNodeB 36. For instance, eNodeB 36 may signal to MME 38 to trigger this registration. Further, in response to the attach request indicting that the WCD supports CSFB functionality, MME 38 may also signal to IWS 32 to trigger registration of the WCD with the CDMA network 14. In particular upon receipt of the signal from MME 38, IWS 32 may signal to MSC 48, and the MSC (in cooperation with a home location register and/or other network infrastructure) may register the fact that the WCD is currently served by the LTE network 12. The LTE network may serve the WCD. For instance, the LTE network may assign at least one resource to the WCD (e.g., a bearer) and may use that at least one resource to serve the WCD.

When the MSC 48 receives a request to connect a call to the WCD, the MSC may then send to the IWS 32 a page request, and the IWS may in turn signal to the MME 38. The MME may then signal to the eNodeB to trigger paging of the WCD over the LTE air interface. The eNodeB may then transmit a CSFB page to the WCD, to which the WCD may respond, and the WCD may transmit to the eNodeB a CSFB extended service request message, which the eNodeB may forward to the MME. And likewise, if the WCD seeks to originate a CSFB call, the WCD may establish connectivity with the eNodeB if necessary and may then send a CSFB extended service request message to the eNodeB, which the eNodeB may similarly forward to the MME.

In accordance with the disclosure, the LTE network 12 may have at least one resource allocated to a UE such as WCD 34 in order to serve the UE. Further, LTE network 12 may take into account a likelihood of call-setup success in order to set a hold-timer duration for release of the at least one resource that the first network allocated to the UE. In particular, the LTE network 12 may detect transition of the UE from being served by the LTE network to being served by the CDMA network 14. After the UE transitions from being served by the LTE network 12 to being served by the CDMA network 14, the LTE network may apply a hold-timer having a hold-timer duration for release of the at least one resource that the LTE network allocated to the UE. Before setting the hold-timer duration for the hold-timer, the LTE network 12 may receive from the UE a report including an indication of RF quality of the CDMA network 14. The LTE network 12 may use the reported indication of RF quality as a basis to set the hold-timer duration.

3. Example Network Element Components

Figure 3:
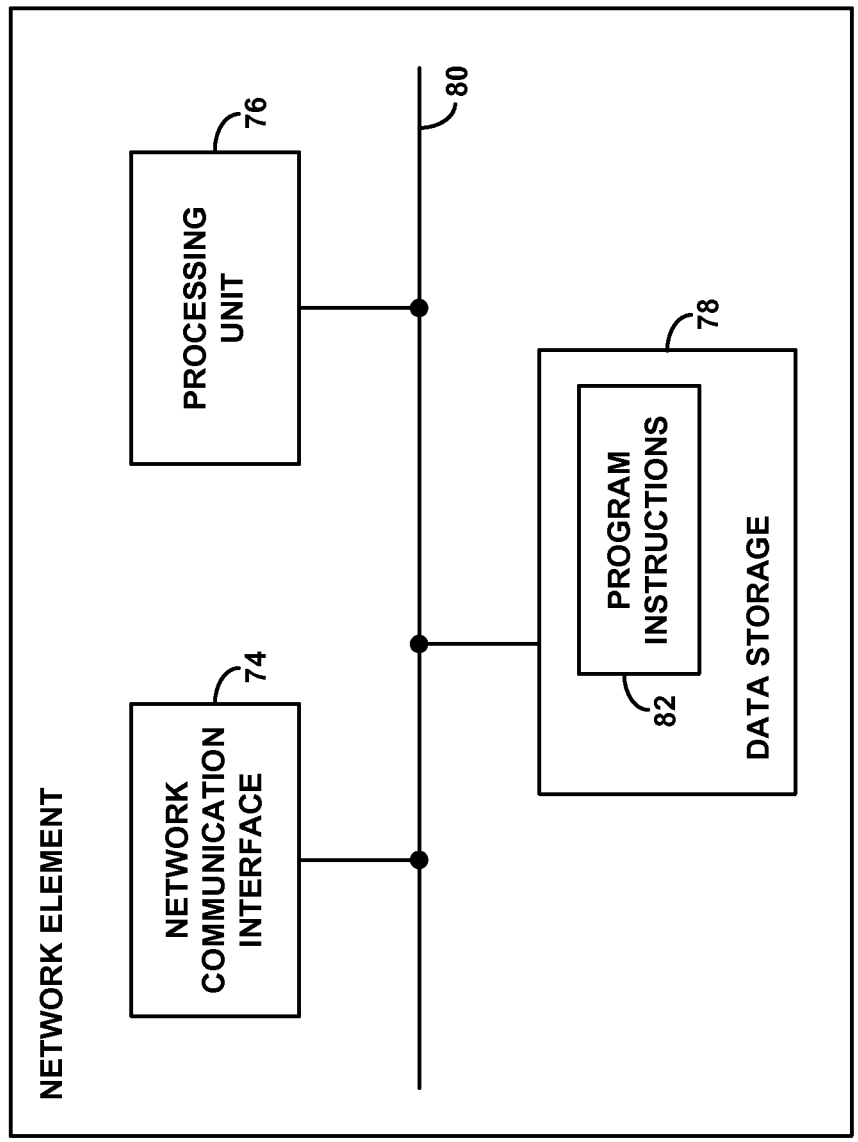
FIG. 3 is a simplified block diagram of a network element operable in a network arrangement such as that depicted in FIGS. 1 and 2.

FIG. 3 is next a simplified block diagram of a network element showing some of the physical components that such an element may include. This block diagram may represent any of a variety of the network elements shown in FIGS. 1 and 2 for instance.

As shown in FIG. 3, the network element includes a network communication interface 74, a processing unit 76, and data storage 78, all of which may be communicatively linked together by a system bus, network, or other connection mechanism 80. With this arrangement, the network communication interface may function to provide for communication with various other network elements and may thus take various forms, allowing for wired and/or wireless communication for instance. Processing unit may then comprise one or more general purpose processors (e.g., microprocessors) and/or one or more special purpose processors (e.g., application specific integrated circuits) and may be integrated in whole or in part with the network communication interface. And data storage 78 may comprise one or more volatile and/or non-volatile storage components, such as optical, magnetic, or flash memory and may be integrated in whole or in part with the processing unit. As shown, by way of example, data storage 78 may then comprise program instructions 82, which may be executable by processing unit 76 to carry out various functions described herein.

In an exemplary embodiment, data storage 78 may include program instructions that are executable to cause a first wireless network (e.g., LTE network 12) or at least one component of the first wireless network to perform functions comprising: (i) allocating at least one resource to the UE; (ii) using the at least one resource to serve the UE; (iii) detecting transition of the UE from being served by the wireless network to being served by a second wireless network; (iv) after the UE transitions from being served by the wireless network to being served by the second wireless network, applying a hold-timer having a hold-timer duration for release of the at least one resource that the wireless network allocated to the UE; (v) before setting the hold-timer duration for the hold-timer, receiving from the UE a report including an indication of RF quality of the second wireless network; and (vi) using the reported indication of RF quality as a basis to set the hold-timer duration.

4. Example Operation

Figure 4:
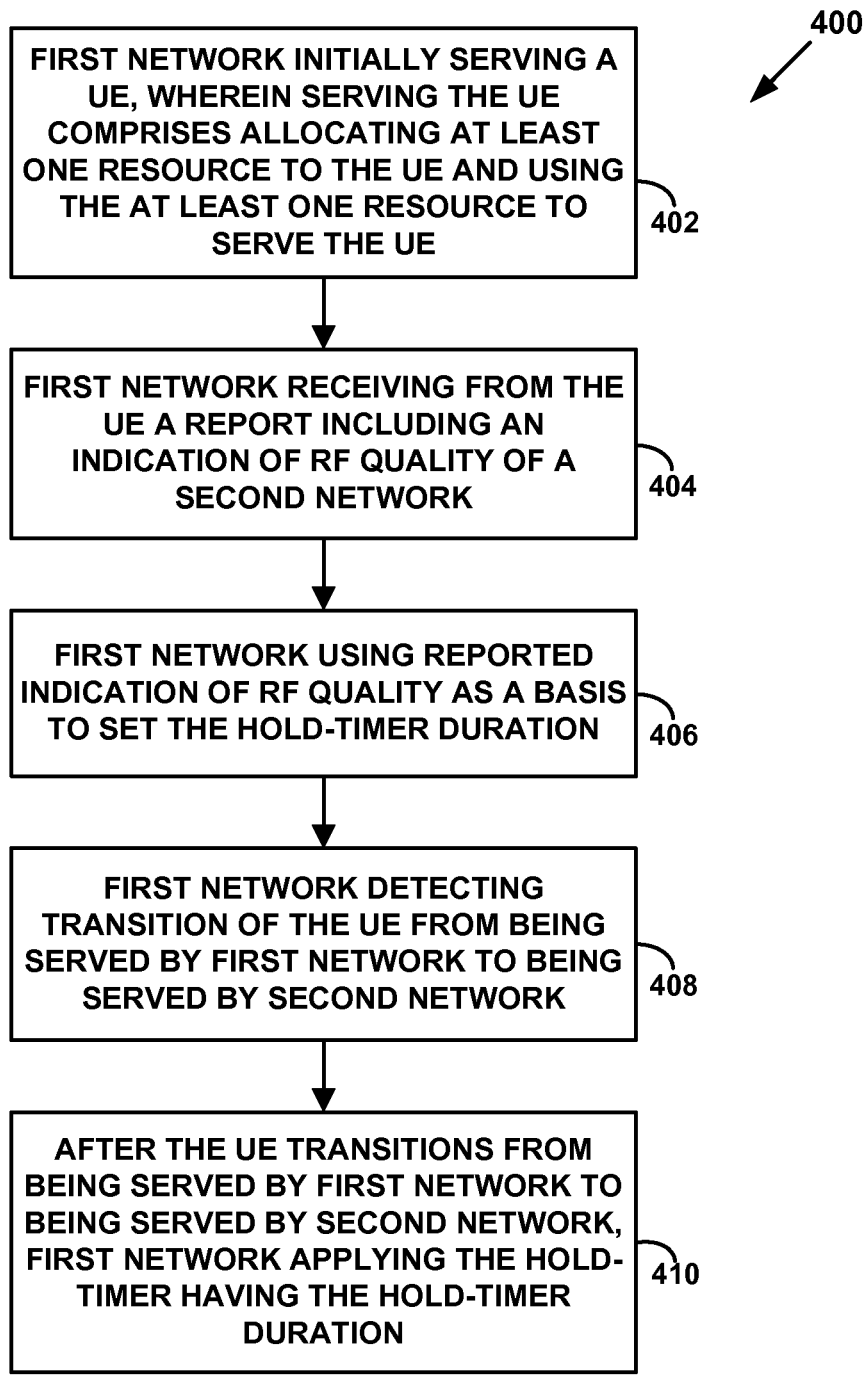
FIG. 4 is a flow chart depicting functions that can be carried out in accordance with an example method.

FIG. 4 is next a flow chart depicting a method 400 that can be carried out in accordance with the present disclosure, in an arrangement such as that depicted in FIG. 1 or more specifically in FIG. 2 for instance, and that can thus be implemented by one or more of the illustrated network elements as discussed above.

As shown in FIG. 4, at block 402, the method involves, a first network initially serving a UE, wherein the first network serving the UE comprises the first network allocating at least one resource to the UE and using the at least one resource to serve the UE. The method also involves, at block 404, the first network receiving from the UE a report including an indication of RF quality of the second network. Further, the method involves, at block 406, the first network using the reported indication of RF quality as a basis to set the hold-timer duration. Still further, the method involves, at block 408, the first network detecting transition of the UE from being served by the first network to being served by the second network. Still further, the method involves, at block 410, after the UE transitions from being served by the first network to being served by the second network, the first network applying the hold-timer having the hold-timer duration for release of the at least one resource that the first network allocated to the UE.

In an example embodiment, these functions of method 400 could be carried out by a first wireless network such as LTE network 12 illustrated in FIG. 2. Further, the second network may be a second network such as CDMA network 14, and the UE may be a WCD such as WCD 34. As mentioned above, these networks could take other forms as well, using other protocols such as WiMAX, GSM, or others now known or later developed. Still further, the method 400 may be carried out by a component or a combination of components of the first wireless network 12. For example, the method may be carried out by a first wireless network node such as eNodeB 36, or the method may be carried out by a combination of network elements such as eNodeB 36 and MME 38. Other examples are possible as well.

Returning to FIG. 4, at block 402, first network 12 serves UE 34, and serving the UE may involve the first network allocating at least one resource to the UE. For example, first network 12 may allocate a bearer to UE 34 and may use that bearer to serve the UE with a data connection. In another example, the at least one resource may include a context resource, such as a context record, stored at the PGW, SGW, MME, eNodeB, or the like, for the UE. Other example resources are possible as well.

In the method of FIG. 4, UE 34 may transition from being served by the first network 12 to being served by the second network 14. The UE may transition from the first network to the second network for various reasons. In an example, the UE may transition from first network 12 to second network 14 for a fallback communication such as a CSFB call. For instance, as UE 34 is being served by first network 12, the UE may either receive a call from a call destination such as WCD 52 or place a call to a call destination such as WCD 52. First network 12 may then signal to invoke set up of a CSFB call between the UE and the call destination via second network 14. After UE 34 transitions from being served by first network 12 to being served by second network 14, the first network may apply a hold-timer having a hold-timer duration for release of the at least one resource that the first network allocated to the UE.

Returning to FIG. 4, at block 404, before setting the hold-timer duration for the hold-timer, first network 12 receives from UE 34 a report including an indication of RF quality of second network 14. In an example, first network 12 may receive from UE 34 the report including the indication of RF quality of second network 14 before the UE transitions from being served by the first network to being served by the second network. For instance, as mentioned above, the first network may receive the report during the CSFB-signaling process. In another example, however, the first network may receive from the UE the report including the indication of RF quality of the second network after the UE transitions from being served by the first network to being served by the second network.

The reported indication of RF quality may be any suitable indication of RF signal strength and/or quality. UE 34 may, for instance, measure the signal strength of the second network 14 as $E_C/I_O$ values. This ratio is a ratio comparing (a) the power level at which the UE 34 is receiving the forward link pilot channel ("$E_C$" for "energy per chip") and (b) the power level at which the UE 34 is receiving all transmissions ("$I_O$") on the frequency carrier on which the UE 34 is operating (including the forward link pilot channel). It should be understood, however, that the UE 34 could measure signal strengths of the second network 14 in terms of parameters other than $E_C$ and $I_O$. In another example, the reported indication of RF quality is an indication of a signal-to-noise ratio of the second network 14 measured by the UE 34. Other example indications of signal strength of the second wireless network 14 measured by the UE 34 are possible as well.

At block 406, first network 12 uses the reported indication of RF quality as a basis to set the hold-timer duration. The first network may use the reported indication of RF quality as a basis to set the hold-timer duration in a variety of ways. In an example, using the reported indication of RF quality as a basis to set the hold-timer duration may involve determining a probability of call-setup success based on the reported indication of RF quality. The first network 12 may then set the hold-timer duration to a value based on the determined probability of call-setup success.

In an example, first network 12 may maintain or have access to data that correlates indications of RF quality with respective hold-timer durations. For instance, the data may correlate (i) RF-quality indications falling within a first range with a first hold-timer duration, (ii) RF-quality indications falling within a second range with a second hold-timer duration, (iii) RF-quality indications falling within a third range with a third hold-timer duration, and so forth. This data may comprise data related to a plurality of wireless networks. In another example, this data may be specific to the given coverage area for which the method 400 is applied. Further, using the reported indication of RF quality as a basis to set the hold-timer duration may involve the LTE network 12 referring to the data to determine, based on the reported indication of RF quality, which hold-timer duration to set for the hold timer.

In an example embodiment, if the reported indication of RF quality exceeds a threshold, the first network sets the hold-timer duration to zero. On the other hand, if the reported indication of RF quality does not exceed the threshold, the first network sets the hold-timer duration to a non-zero value. Generally, first network 12 may select any appropriate threshold for determining when to set the hold-timer duration to zero. In an example, the threshold is an RF-quality threshold associated with a given handoff success rate. For instance, the given handoff success rate may be a success rate above 90%. However, other handoff success rates above or below 90% are possible as well. In another example, the threshold may be a given pilot signal strength. For instance, the given pilot signal strength may be an $E_C/I_O$ value less than −100. Further, other suitable threshold numbers and ways of selecting a suitable threshold number are possible as well.

In an example embodiment, the first network selects shorter hold-timer durations for stronger reported indications of RF quality, and vice versa. As a particular example, first network 12 may receive reported indications of RF quality from three UEs. Based on the strength of the reported RF-quality indications, first network 12 may determine that the reported RF-quality indication from the first UE is associated with a handoff success rate of 95%, that the reported RF-quality indication from the second UE is associated with a handoff success rate of 50%, and that the reported RF-quality indication from the third UE is associated with a handoff success rate of 10%. In this example, first network 12 may select a hold-timer duration of zero for the first UE, a hold-timer duration of ten seconds for the second UE, and a hold-timer of 20 seconds for the third UE. It should be understood that the above-detailed examples of call-setup success probabilities and selected hold-timer durations are merely examples and are not meant to be limiting.

Returning to FIG. 4, at block 408, first network 12 detects transition of UE 34 from being served by first network 12 to being served by second network 14. In an example, first network 12 receives a message from second network 14 indicating that UE 34 has successfully transitioned to second network 14. This message may, for example, be a handoff complete message. At block 410, after UE 34 transitions from being served by first network 12 to being served by second network 14, the first network applies the hold-timer having the selected hold-timer duration for release of the at least one resource that the first network allocated to the UE. In an example, first network 12 may begin applying this hold timer in response to detecting transition of UE 34 from being served by first network 12 to being served by second network 14. In another example, first network 12 may begin applying the hold-timer after signaling to invoke setup of the CSFB call via the second network 14 but before detecting transition of the UE 34 from being served by the first network to being served by the second network. For instance, first network 12 may begin applying the hold timer in response to setting the hold-timer duration, which may occur before the first network actually detects transition of the UE from being served by the first network to being served by the second network. Other examples triggers for beginning applying the hold timer are possible as well.

The first network 12 may maintain for the hold-timer duration the at least one resource allocated to the UE 34. This process may help to reserve the at least one resource for the UE should call setup fail. Call setup may fail for various reasons, such as poor RF quality. If call-setup fails and the UE 34 transitions back to the first network 12 before expiration of the hold-timer duration, first network 12 may again use the allocated at least one resource to serve UE 34. In accordance with the disclosed method, the selected hold-timer duration may be longer for calls that have a lower probability of call-setup success.

On the other hand, call-setup may be successful, and the first network 12 may release the at least one resource allocated to the UE at the expiration of the hold-timer duration. In an example, the first network 12 may wait the hold-timer duration and may then, in response to expiration of the hold-timer duration, release the at least one resource. As mentioned above, releasing the at least one resource may involve a full release of the at least one resource (e.g., releasing the bearer and deleting the context record of the UE) or a partial release of the at least one resource (e.g., suspending the bearer but maintaining the context record of the UE).

After releasing the at least one resource allocated to the UE 34, the first network 12 may then use that at least one resource to serve one or more UEs as needed. For example, the first network 12 may use the at least one resource to serve one or more other UEs operating under the coverage of the first network 12, such as WCD 54. In accordance with the disclosed method, the hold-timer duration may be shorter for calls that have a higher probability of call-setup success.

The act of applying the hold-timer having a hold-timer duration for release of the at least one resource may take various forms. For instance, eNodeB 36 may receive from UE 34 the report including the indication of RF quality of second network 14. The eNodeB 36 may then set and apply the hold timer. Further, in response to expiration of the hold-timer duration, the eNodeB 36 may send a message to MME 38 instructing the MME to release the at least one resource. In another example, the MME 38 may receive from UE 34 the report including the indication of RF quality of second network 14, and the MME 38 may then set and apply the hold timer. Other examples are possible as well.

Figure 5:
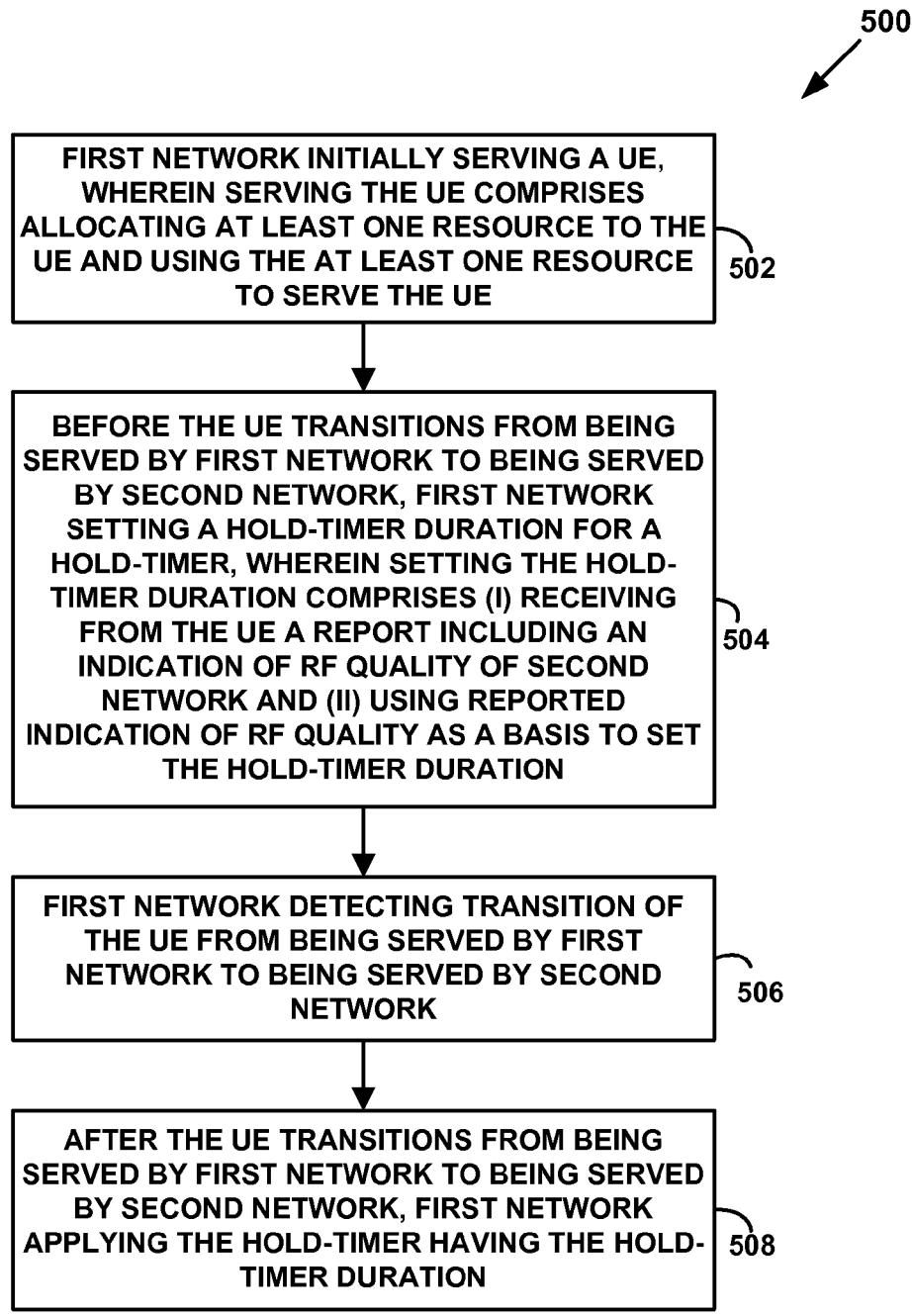
FIG. 5 is another flow chart depicting functions that can be carried out in accordance with an example method.

FIG. 5 is next another flow chart depicting a method 500 that can be carried out with a network arrangement such as that shown in FIG. 1 or FIG. 2 for instance. For example, method 500 may be carried out by LTE network 12. Furthermore, method 500 is similar in some respects to the method 400, and thus is not described in as great of detail. It should be explicitly noted, however, that any possibilities and permutations described above with respect to method 400 may equally apply to method 500, and vice versa.

As shown in FIG. 5, method 500 involves, at block 502, a first network initially serving a UE, wherein the first network serving the UE comprises the first network allocating at least one resource to the UE and using the at least one resource to serve the UE. As discussed above, the UE may transition from the first network to the second network for various reasons. The method involves, at block 504, before the UE transitions from being served by the first network to being served by the second network, the first network setting a hold-timer duration for a hold-timer for release of the at least one resource that the first network allocated to the UE, wherein setting the hold-timer duration comprises (i) the first network receiving from the UE a report including an indication of radio frequency (RF) quality of the second network and (ii) the first network using the reported indication of RF quality as a basis to set the hold-timer duration.

Further, the method involves, at block 506, the first network detecting transition of the UE from being served by the first network to being served by a second network. Yet still further, the method involves, at block 508, after the UE transitions from being served by the first network to being served by the second network, the first network applying the hold-timer having the hold-timer duration. In an example, the first network waits the hold-timer duration and, in response to expiration of the hold-timer duration, releases the at least one resource.

5. Example Benefit of the Disclosed Method and System

The proposed method and system beneficially provides an improved way to set a hold-timer duration for releasing at least one resource allocated to a UE. In particular, the disclosed method and system may take into account the likelihood of CSFB call-setup success. As described above, an example problem associated with using a static value for the hold-timer duration is that, in some cases (e.g., if call setup is successful), the LTE network will hold onto resources too long when a UE moves away from the LTE network, but in other cases (e.g., if call setup fails), the LTE network will not hold on to the resources long enough.

By selecting a hold-timer duration based on a reported indication of RF quality, the first network may beneficially select an amount of time to maintain the resources for the UE that takes into account the likelihood of call-setup success. For example, if the likelihood of call-setup success is high, the first network may select a short hold-timer duration, thus efficiently freeing up resources in order to serve other UEs. On the other hand, if the likelihood of call-setup success is low, the first network may select a longer hold-timer duration, thus accounting for the possibility that call-setup may fail and the UE may transition back to the first network. Further, by providing this improved way to select a hold-timer duration for releasing at least one resource allocated to a UE, the disclosed method and system may in turn improve service quality for UEs operating in a wireless network. Therefore, the disclosed method and system can help to improve service quality overall for users, thus increasing user satisfaction with wireless performance.

6. Conclusion

Exemplary embodiments have been described above. Those skilled in the art will understand, however, that changes and modifications may be made to these embodiments without departing from the true scope and spirit of the invention.

We claim:

1. In a communication system comprising a first network configured to serve user equipment devices (UEs) according to a first air interface protocol and a second network configured to serve UEs according to a second air interface protocol, a method comprising:
   the first network initially serving a UE, wherein the first network serving the UE comprises the first network allocating at least one resource to the UE and using the at least one resource to serve the UE;
   the first network detecting transition of the UE from being served by the first network to being served by the second network;
   after the UE transitions from being served by the first network to being served by the second network, the first network applying a hold-timer having a hold-timer duration for release of the at least one resource that the first network allocated to the UE;
   before setting the hold-timer duration for the hold-timer, the first network receiving from the UE a report including an indication of radio frequency (RF) quality of the second network; and
   the first network using the reported indication of RF quality as a basis to set the hold-timer duration.

2. The method of claim 1, further comprising:
   maintaining data that correlates indications of RF quality with respective hold-timer durations, wherein using the reported indication of RF quality as a basis to set the hold-timer duration comprises referring to the data to determine, based on the reported indication of RF quality, which hold-timer duration to set for the hold timer.

3. The method of claim 1, wherein the first network applying the hold-timer having a hold-timer duration for release of the at least one resource comprises:
   the first network waiting the hold-timer duration; and
   in response to expiration of the hold-timer duration, the first network releasing the at least one resource.

4. The method of claim 1, wherein the at least one resource comprises a resource selected from the group consisting of a bearer resource and a context resource.

5. The method of claim 1, wherein the reported indication of RF quality is selected from the group consisting of (i) an indication of a signal strength of the second network measured by the UE and (ii) an indication of a signal-to-noise ratio of the second network measured by the UE.

6. The method of claim 1, wherein using the reported indication of RF quality as a basis to set the hold-timer duration comprises:
   determining a probability of call-setup success based on the reported indication of RF quality; and
   setting the hold-timer duration to a value based on the determined probability of call-setup success.

7. The method of claim 1, wherein the first network using the reported indication of RF quality as a basis to set the hold-timer duration comprises (i) if the reported indication of RF quality exceeds a threshold, the first network setting the hold-timer duration to zero, but (ii) if the reported indication of RF quality does not exceed the threshold, the first network setting the hold-timer duration to a non-zero value.

8. The method of claim 7, further comprising selecting the threshold, wherein selecting the threshold comprises selecting the threshold such that the threshold is an RF-quality threshold associated with a given call-setup success rate.

9. The method of claim 8, wherein the given call-setup success rate is above 90%.

10. The method of claim 1, wherein, before expiration of the hold-timer duration, the UE transitions from being served by the second network back to being served by the first network, and wherein the method further comprises the first network again using the allocated at least one resource to serve the UE.

11. The method of claim 1, wherein the first network comprises an eNodeB and a mobility management entity (MME), wherein the first network receiving from the UE the report including the indication of RF quality of the second network comprises the eNodeB receiving from the UE the report including the indication of RF quality of the second network, wherein the first network using the reported indication of RF quality as a basis to set the hold-timer duration comprises the eNodeB setting the hold-timer duration, the method further comprising:
   the eNodeB applying the hold timer; and
   in response to expiration of the hold-timer duration, the eNodeB sending a message to the MME instructing the MME to release the at least one resource.

12. The method of claim 1, wherein the first network comprises an eNodeB, wherein the first network receiving from the UE the report including the indication of RF quality of the second network comprises the eNodeB receiving from the UE the report including the indication of RF quality of the second network, and wherein the first network using the reported indication of RF quality as a basis to set the hold-timer duration comprises the eNodeB setting the hold-timer duration.

13. The method of claim 1, wherein the first network is a Long Term Evolution (LTE) network, and wherein the second network is selected from the group consisting of a Code Division Multiple Access (CDMA) network and a Global System for Mobile Communications (GSM) network.

14. The method of claim 1, wherein the release of the at least one resource that the first network allocated to the UE comprises releasing a bearer allocated to the UE and deleting a context record of the UE.

15. The method of claim 1, wherein the release of the at least one resource that the first network allocated to the UE comprises releasing a bearer allocated to the UE but maintaining a context record of the UE.

16. A wireless network comprising:
   an antenna that radiates to define a coverage area;
   a memory configured to store program instructions; and
   a processor capable of executing the program instructions to:
      (i) allocate at least one resource to the UE;

(ii) use the at least one resource to serve the UE;

(iii) detect transition of the UE from being served by the wireless network to being served by a second wireless network;

(iv) after the UE transitions from being served by the wireless network to being served by the second wireless network, apply a hold-timer having a hold-timer duration for release of the at least one resource that the wireless network allocated to the UE;

(v) before setting the hold-timer duration for the hold-timer, receive from the UE a report including an indication of radio frequency (RF) quality of the second wireless network; and (vi) use the reported indication of RF quality as a basis to set the hold-timer duration.

17. The wireless network of claim 16, wherein the wireless network is a Long Term Evolution (LTE) network, and wherein the second wireless network is selected from the group consisting of a Code Division Multiple Access (CDMA) network and a Global System for Mobile Communications (GSM) network.

18. In a communication system comprising a first network configured to serve user equipment devices (UEs) according to a first air interface protocol and a second network configured to serve UEs according to a second air interface protocol, a method comprising:

the first network initially serving a UE, wherein the first network serving the UE comprises the first network allocating at least one resource to the UE and using the at least one resource to serve the UE;

the first network detecting transition of the UE from being served by the first network to being served by the second network;

before the UE transitions from being served by the first network to being served by the second network, the first network setting a hold-timer duration for a hold-timer for release of the at least one resource that the first network allocated to the UE, wherein setting the hold-timer duration comprises (i) the first network receiving from the UE a report including an indication of radio frequency (RF) quality of the second network and (ii) the first network using the reported indication of RF quality as a basis to set the hold-timer duration; and after the UE transitions from being served by the first network to being served by the second network, the first network applying the hold-timer having the hold-timer duration.

19. The method of claim 18, wherein the first network is a Long Term Evolution (LTE) network, and wherein the second network is selected from the group consisting of a Code Division Multiple Access (CDMA) network and a Global System for Mobile Communications (GSM) network.

20. The method of claim 18, wherein the first network applying the hold-timer having the hold-timer duration comprises:

the first network waiting the hold-timer duration; and in response to expiration of the hold-timer duration, the first network releasing the at least one resource.

* * * * *